July 27, 1965 W. J. MAHONEY 3,197,762
BINARY TO DECIMAL CONVERTER CIRCUIT
Filed Aug. 24, 1962 5 Sheets-Sheet 1

INVENTOR
WILLIAM J. MAHONEY
BY [signature]
ATTORNEY

BINARY TO DECIMAL CONVERTER CIRCUIT

Filed Aug. 24, 1962

INVENTOR
WILLIAM J. MAHONEY
BY
ATTORNEY

BINARY TO DECIMAL CONVERTER CIRCUIT

INVENTOR
WILLIAM J. MAHONEY
BY
ATTORNEY

BINARY TO DECIMAL CONVERTER CIRCUIT

Filed Aug. 24, 1962

INVENTOR
WILLIAM J. MAHONEY
BY
ATTORNEY

July 27, 1965 W. J. MAHONEY 3,197,762

BINARY TO DECIMAL CONVERTER CIRCUIT

Filed Aug. 24, 1962 5 Sheets-Sheet 5

INVENTOR
WILLIAM J. MAHONEY
BY
ATTORNEY

United States Patent Office 3,197,762
Patented July 27, 1965

3,197,762

BINARY TO DECIMAL CONVERTER CIRCUIT

William J. Mahoney, Darien, Conn., assignor to American Machine & Foundry Company, a corporation of New Jersey Filed Aug. 24, 1962, Ser. No. 219,214
10 Claims. (Cl. 340—347)

The invention relates to data processing and particularly to the conversion of data or other information in one numerical form to another numerical form more convenient for the desired use, such as a binary to decimal information conversion system.

A general object of the invention is to convert information in one form of numerical notation to another form of numerical notation.

A more specific object is to translate efficiently and economically binary-coded information into a train of electric pulses which are the exact decimal equivalent of the coded information.

A related object is to convert numbers coded in the binary form to equivalent decimal pulse form.

The copending U.S. patent application of Ralph Townsend, Serial No. 204,555, filed June 22, 1962, discloses in combination with a source of binary-coded signals representing different digits of a number to be converted to the decimal form, a conversion circuit including means for generating a series of equal pulses connected through an output gate to an output line, a binary counter comprising a plurality of series-connected counter stages and control means including a number of input and other gates and flip-flops, responsive to a starting pulse initiating a conversion cycle to first clear all of the counter stages to the same operating condition; then to condition the input gates respectively supplied from the source with binary-coded signals representing different digits of the number to be converted so that they are effective to cause the number, or its complement, to be entered into the binary counter; then to open the output gate allowing a train of pulses from the pulse generating means to pass to the output line, and to the series-connected counter stages causing them to count the applied pulses until the outputs of all of the stages are brought to the same operated condition, and responsive to that condition to cause the closing of the output gate shutting off the train of pulses from the output line and the binary counter; the number of pulses in the train passed to the output line and counted by the binary counter in a conversion cycle being the decimal equivalent of the binary number at the input of the circuit.

It is a further object to improve a binary to decimal converter of the above general type from the standpoint of operation and accuracy of conversion.

These objects are attained in accordance with the invention mainly by the following modifications of the basic binary to decimal circuit:

The pulse generating means is an oscillator which is continuously operative to produce alternately two opposite phase outputs comprising a series of square-shaped pulses with the same pulse width at a given pulse repetition rate and approximately 1:1 mark/space ratio. The two outputs differ in phase by 180 degrees, the −180° phase output leading the 0° phase by the normal pulse width.

The chain of counter stages in the binary counter is connected in series by a direct connection of the ZERO output of each stage to the binary count input of the next stage, the binary count input of the first stage being connected to the output of the output gate. Each binary-coded signal from said source representing a different digit of the number to be converted to decimal form is supplied through an individual logic inverter to one input of an individual normally-disabled AND input gate the output of which is connected to the ONE input of a different binary counter stage. The ONE outputs of all of the binary counter stages form separate inputs to another AND gate which functions to cause the disabling of the output gate when all of the outputs of the binary counter stages are counted to the ONE condition.

The starting pulse initiating a conversion cycle is applied directly to the ZERO outputs of all of the binary counter stages to clear them to the ZERO operating condition and then with a predetermined amount of delay to the input gates to enable those which have a ONE signal presented by the associated logic inverter to pass that signal to the ONE input of the associated binary counter stage thus effectively entering the complement of the number into the binary counter.

The modified connections of the binary counter stages allow their proper operation without interference between the stages while they are being set to the ZERO operating condition without requiring any additional control apparatus for this purpose. Also, by employing an oscillator producing a square-wave pulse of approximately 1:1 mark/space ratio at a given repetition frequency (5 kc.), the turning ON of the flip-flop to control the output gate so as to gate a partial pulse to give undeterminable operation by a count of one pulse, is prevented.

A feature of the invention is the use in the flip-flop enabling circuit for the output gate of a circuit for conditioning the output gate for enablement in advance of the application of the 0° phase pulse output of the pulse oscillator thereto and the use in the flip-flop disabling circuitry of additional circuitry which will cause the closing of the AND gate responsive to the ONE outputs of the binary counter stages to lag a time interval equal to the pulse width after the last binary counter stage has counted to ONE, which ensures that the first and last oscillator pulse in the train out of the output gate have their normal full pulse width.

Another feature is a circuit for preventing a spurious count by the conversion circuit when the operator initiates a command or starting pulse in the absence of any applied binary signal information from the associated source of the binary-coded signals.

These and other objects and features of the invention will be better understood from the following detailed description thereof when it is read in conjunction with the accompanying drawings in which.

Figure 6:
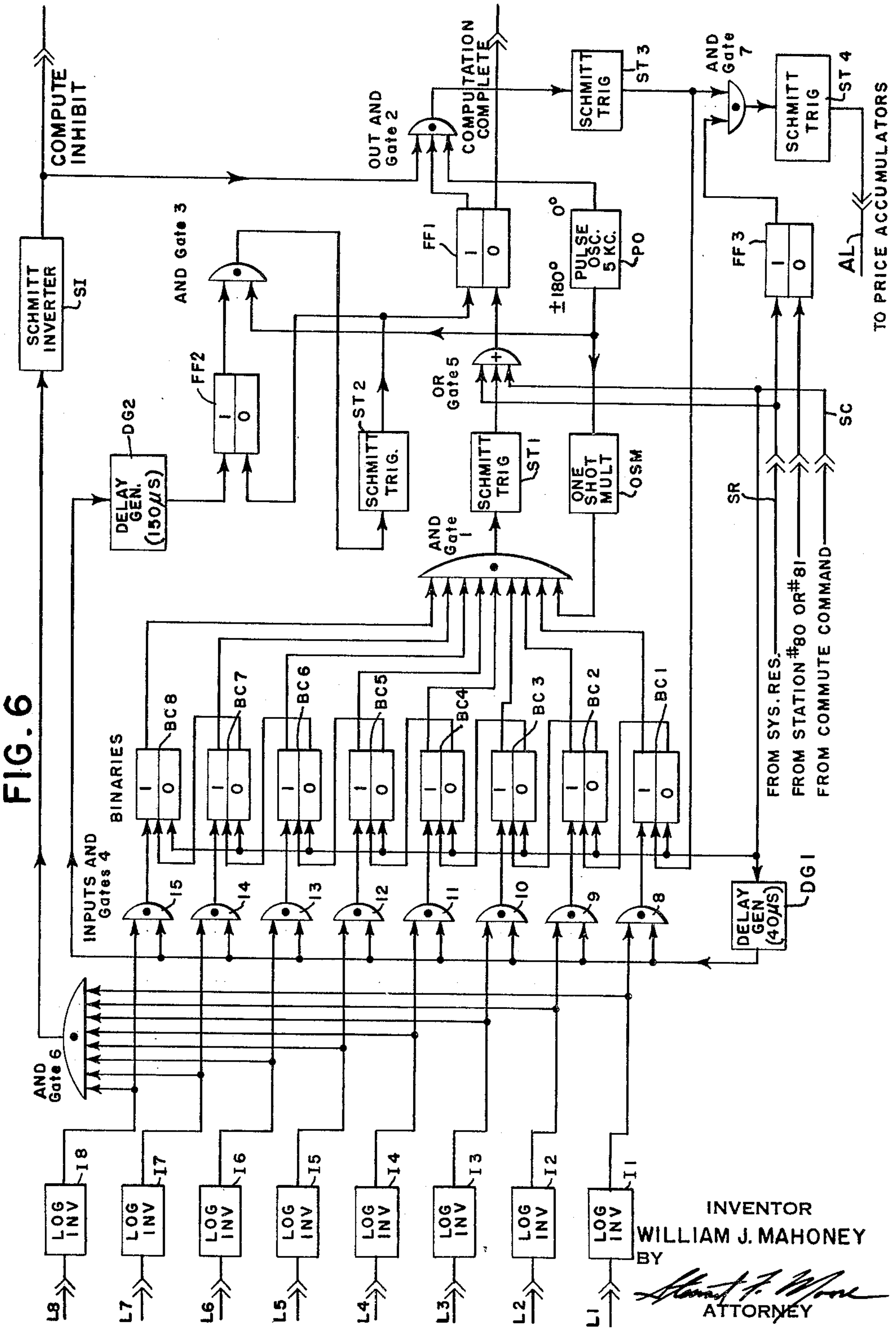
FIG. 6 shows a block diagram of a binary to decimal conversion circuit embodying the invention.
Figure 7A:
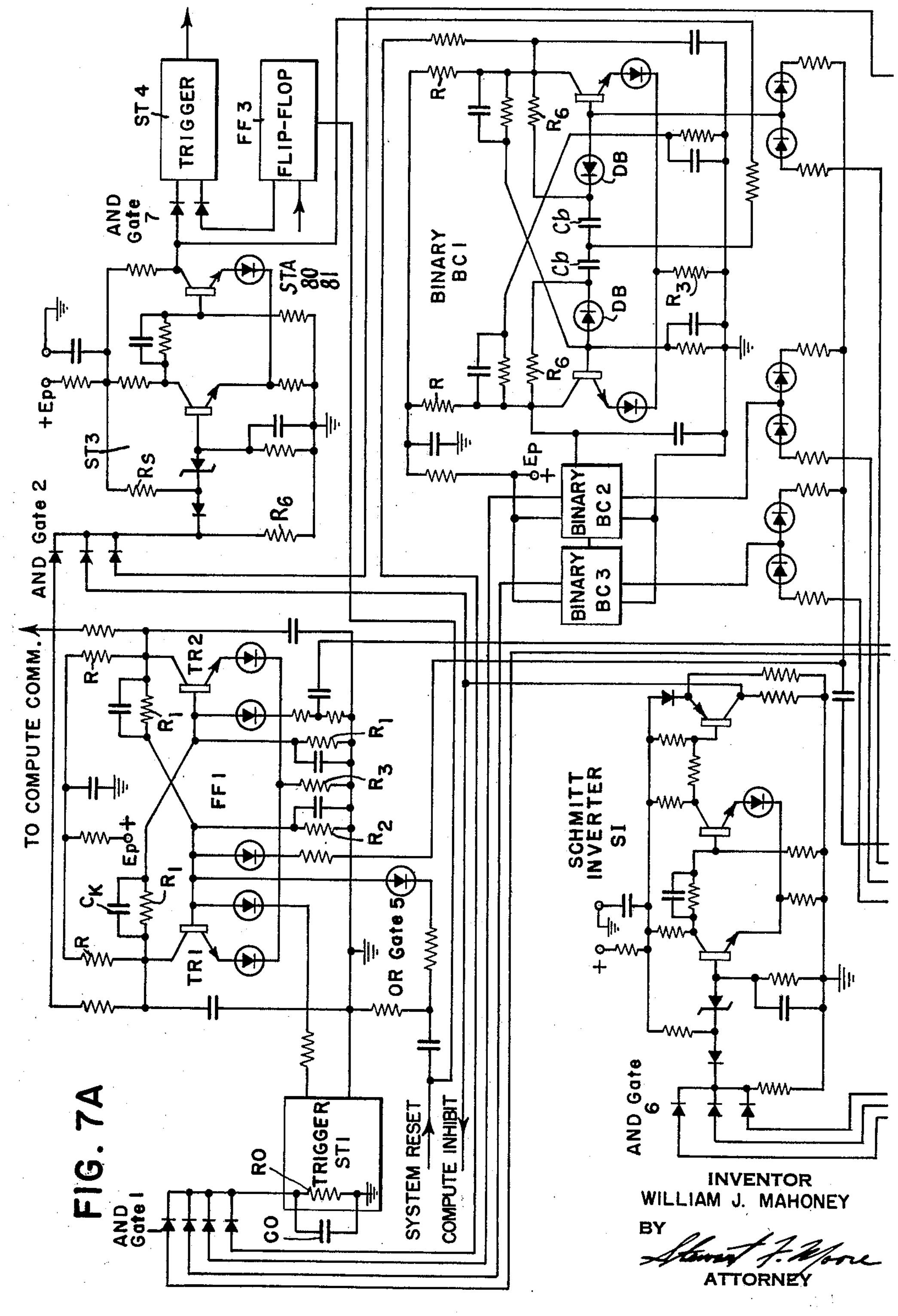
Figure 7B:
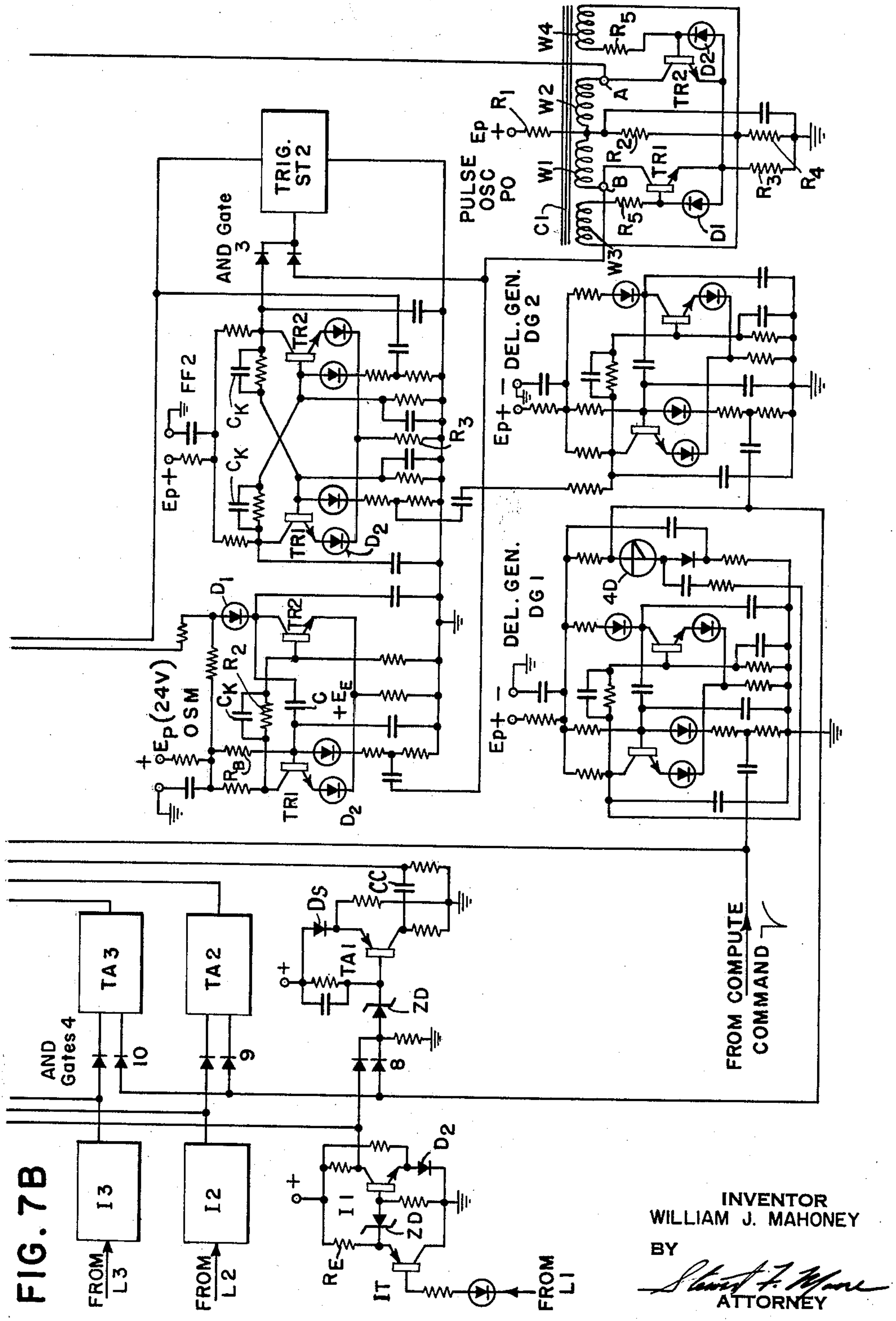
Figure 8:
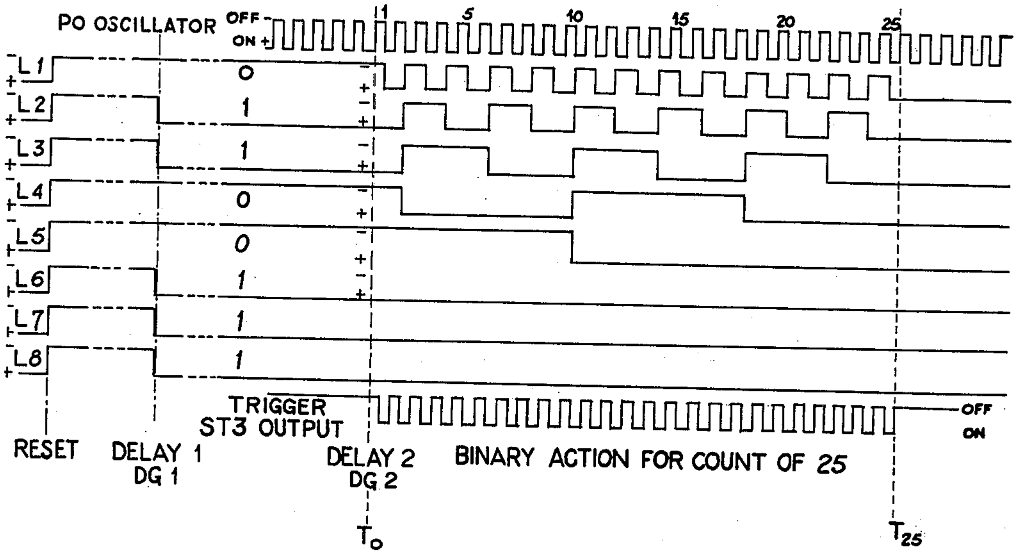
Figure 9:
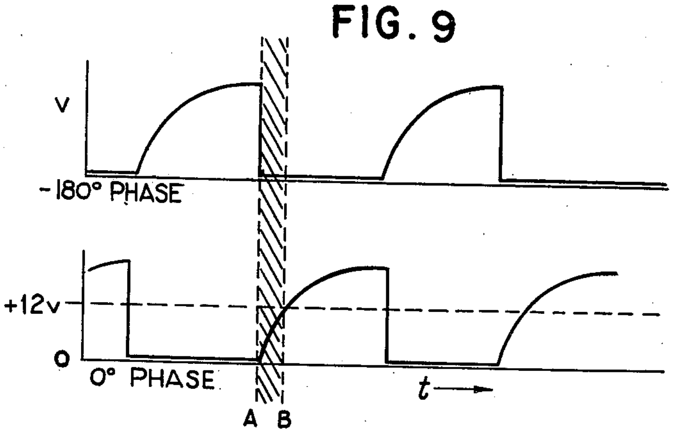
Figure 10:
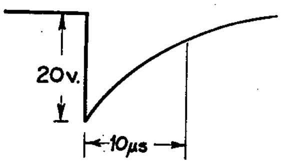

FIGS. 7A and 7B disclose detailed circuit arrangements which were used in one practical embodiment of the invention which has been constructed and operated with satisfactory results; and FIGS. 8, 9, and 10 show waveshapes used to illustrate the operation of the circuits in connection with the description of the binary to decimal converter shown in FIGS. 6, 7A, and 7B.

The circuitry for the conversion functions provided by the binary to decimal converter are of the digital type, presenting either a fully off (ZERO) or fully on (ONE) condition.

The symbols for the known digital elements used in the converter of FIG. 6 will be briefly described with reference to FIGS. 1 to 5.

Figure 1:
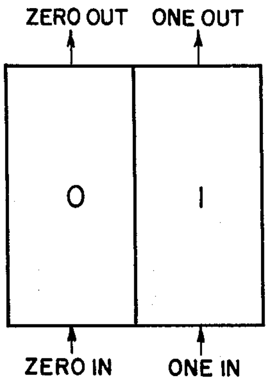
FIGS. 1 to 5 show the symbols used in the block diagram of FIG. 6 to illustrate known apparatus elements in connection with a broad description of their functions.

The flip-flop has two possible states, the ONE and ZERO states. It can be flipped or flopped from one state to the other by short duration pulses, and remembers indefinitely the last state in which is has been thrown. The usual symbol for a flip-flop is shown in FIG. 1. Input signals are usually short duration impulses shown by arrows directed into the input sides of the flip-flop. Output signals are indicated by arrows coming out of the symbol from the same side as the corresponding input signal. Therefore, an impulse into the left side will cause conduction in or enable the left side. The right side would be non-conducting or inhibited. This is called the ZERO state. Further impulses delivered to the same side do not change this state, but an impulse delivered to the ONE input side reverses the state of the flip-flop so that its ONE output side generates an enable signal and its ZERO side an inhibit signal. The flip-flop is now in the ONE state and remains there until an impulse is next delivered to the ZERO input terminal.

Figure 2:
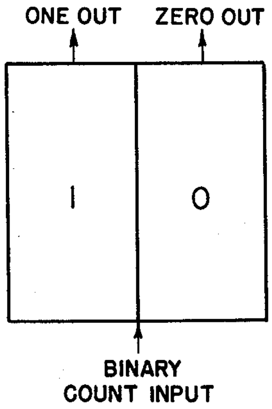
Figure 3:
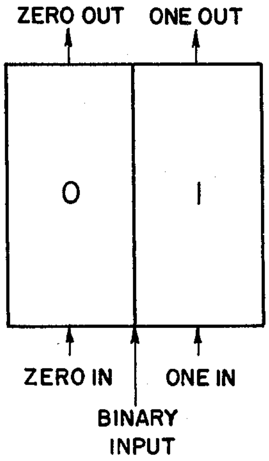
Figure 4:
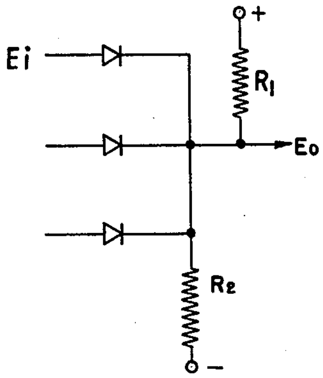

A binary counter is similar to the flip-flop, having two stable states and the property of remaining indefinitely in the state into which it was last thrown. By a repeated application of a short duration impulse to its center binary count input terminal, it is alternately thrown from one state to another. Thus, the device divides the input impulse repetition rate by two. Its logic symbol is shown in FIG. 2. The addition of input terminals to each side of the binary counter makes the counter into a combination device, which can be set into either a ZERO or ONE state before the train of impulses appears at the binary count input, as shown in FIG. 3.

A logical AND gate is a device with a multiplicity of input terminals and a single output terminal. The AND gate performs the logical operation of emitting a ONE signal if all of its inputs are ONE. The circuit implementation of the AND gate as used in the binary to decimal converter of the invention is the negative-going diode gate shown in FIG. 4. As long as any input $E_i$ is held at positive supply, the diode clamps point $E_0$ to a positive potential. If all inputs $E_i$ are negative, then point $E_0$ is allowed to drop to a negative potential determined by the ratio of $R1/R2$.

Figure 5:
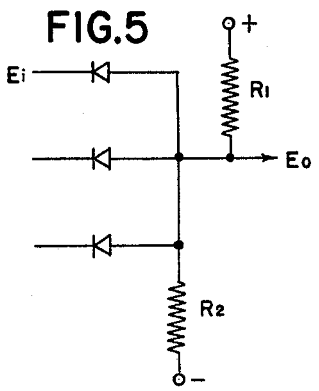

A logical OR gate has several inputs and one output. If any input is a logical ONE then the output is also ONE. The negative-going OR gate as used in the binary to decimal converter is shown in FIG. 5. If no diodes are connected to minus supply, then the output voltage $E_0$ is determined by the ratio $R1/R2$. If any diode is returned to minus supply, then the point $E_0$ assumes the minus potential (less the voltage drop of the diode). In the binary to decimal converter, these gates are used mainly at the input of flip-flops or one-shot multivibrators to provide initiating impulses from a number of sources, with the diodes acting to provide isolation between sources.

The well-known Schmitt triggering circuit is a voltage sensing regenerative device used in the converter of the invention for D.C. level restoration, to reduce loading to a gating source or to restore a deteriorated step waveform. The two-stage circuit is non-inverting, thus for a ZERO input level an output ZERO is presented and for a ONE input, the output is ONE. A logic inverting Schmitt is one in which the output level is required to be inverted from the input. This is accomplished by adding a third cascaded stage to the standard Schmitt, thereby altering the non-inverted output to an inverted one.

Several time delay generators are used in the converter to provide a negative pulse at the end of a predetermined time interval. These generators are used to initiate triggering pulses to change the state of following flip-flops, and binary counters to be referred to hereinafter as binaries. Where a large pulse is needed, as when eight binaries are to be simultaneously set, as in the present converter, a known Shockley diode power pulse generator is interposed between the time delay generator and the loads. A one-shot generator, such as a one-shot multivibrator, is used to form pulses of finite widths, when energized from either longer or shorter pulses. An example of this is the one-shot generator OSM, used in the converter circuit of FIG. 6, which emits a 40 μs. pulse when triggered from the 5 kc. oscillator PO. The initiating trigger from the oscillator PO occurs every 200 μs.

A two-stage transistor amplifier is used to invert the logic levels. An emitter follower transistor is used for the input, which presents a very light load to the source circuit. The follower does not invert, so a second stage is used for the voltage inversion. These devices are used for the logic inverters I1 to I8 in FIGS. 6 and 7.

FIG. 6 is the logic diagram of a binary to decimal converter in accordance with the invention used to convert a number, for example, the price of a food item, in binary-coded form to the equivalent decimal pulse form.

Referring to FIG. 6, a source of binary-coded signals present either ZERO or ONE binary signals representing different digits of the number to be converted to decimal form, to one of the input coding lines L1 to L8. For example, if the price of a food item is 25 cents, its binary code is 00011001 and the binary coded signal presented to line L1 is a 1, to line L2 is a 0, to line L3 is a 0, to line L4 is a 1, to line L5 is a 1 and to lines L6, L7 and L8 are all 0.

The output of the converter is to be a train of pulses of the decimal equivalent of the coded input information, in this example, 25 pulses. These pulses are to be presented to the price accumulators in the accumulator line AL. The pulse repetition rate was selected as 5 kilocycles (kc.) and the pulse width as 100 μs. (one-half of a 5 kc. squarewave). The function of the internal logic elements to be described in connection with FIG. 6 is to convert or meter precisely the correct number of pulses for the given binary number.

The 5 kc. multivibrator oscillator PO is the source of these pulses. It is free-running and its ouput is to be gated on and off by the internal logic gating devices to be described. It is a multivibrator, when one side of it is ON, the other side is OFF; and vice versa. It produces alternately two opposite-phase squarewave pulse outputs, one of the pulse outputs leading the other by 100 μs. If we consider one pulse output as 0° phase this output is supplied as one input to the output AND gate 2, to be referred to hereinafter as output gate 2, the output of which feeds the line AL. The basic function of the internal logic is to set the binary-coded number into the series-connected binary counters or binaries BC1 to BC8, to open the output gate 2, then to use the pulses in a train from the oscillator PO both to present a signal to the accumulator line AL and count down the binaries to the gate 1 to 11111111, and when the final binary digit is counted into the ONE condition to cause the output of gate 2 to be closed and the pulse train in the accumulator line AL to be shut off. In the given example, it will require exactly 25 pulses to count from 11100110 (the complementary code of 25) to 11111111.

When all the binaries reach their ONE state, the AND gate 1 is operated and a signal is transmitted to the ZERO input of the output gate which inhibits that gate.

The mechanism for setting the binaries BC1 to BC6 to the proper condition for counting will now be described.

From the previous computation, the binaries have been left in their 11111111 state, that is all ONES will be enabled. Upon initiation of the next compute command or starting pulse by the operator, the binaries will be first reset to ZERO, then after a predetermined delay to allow the binaries to settle down, an impulse will be transmitted to the input AND gates which will enable those gates only which have a ONE binary signal presented by the associated logic inverter and cause the binaries connected to these gates to be set to their ONE condition and all other binaries to remain in their ZERO states.

It is seen that three states are described: at rest from prior computation; reset upon compute command; and set into coded condition. Two procedures are possible for setting in the code.

Coding Procedure #1:

(1) At rest 11111111
(2) Reset 00000000
(3) Set 1's 11100110

Coding Procedure #2:

(1) At rest 11111111
(2) Reset 11111111
(3) Set 0's 11100110 (complement of 00011001)

In the third step of Procedure #1, the ONES are set in. In the third step of Procedure #2, the ZEROS are set in.

Procedure #1 was chosen for the following reason. When ZEROS are set in, a carry signal is generated from each binary output. In the absence of a restraining signal on the ZERO flip-flop input terminal of the following binary, this binary would be caused to change state, falsifying the code. Such a condition would occur in Procedure #2 where ZEROS are set into selected binaries in step 3 with no restraining signal on the adjacent flip-flop ZERO input line. In Procedure #1, the situation is avoided, as ZEROS are set into the binaries in step 2, with strong initiating impulses appearing simultaneously on all ZERO flip-flop input terminals of the binaries which the generated carry signal cannot overcome. Subsequently, in step 3 ONES are set into the selected binaries, not generating a carry signal.

It will be obvious that the logic inverters I1 to I8 are required to generate the complement of the coded number as the input lines L1 to L8 that are inhibited (ZERO signal) must generate an enable signal to reset their associated binaries back to the ONE condition.

The binaries BC1 to BC8 are now conditioned to receive the pulse train on their input lines. Remembering that each time a ZERO is enabled (the ONE signal becomes positive-going), a carry signal is generated which changes the state of the adjacent binary, the timing pattern being as shown in FIG. 8 for a count of 25.

Another function of the internal logic is to open and close the AND output gate 2 at the beginning and end of the pulse train in a conversion cycle. The connections of the binaries and the associated internal logic elements for accomplishing the conversion functions will now be described in connection with FIG. 6. Various supernumerary circuits are included in the circuits of FIGS. 6 to 8 to provide noise immunity, restore D.C. levels, provide unambiguous triggering impulses and initiate commands to the associated circuits.

Referring to FIG. 6, the oscillator PO as above described has its 0° phase pulse output connected to one input of the AND output gate 2. The output of gate 2 is connected through other circuits, to be described later, to an accumulator line AL which includes a plurality of pulse storing elements, such as price accumulators as indicated. A second input of the output gate 2 is provided from the ONE output of the associated two-input flip-flop FF1.

The outputs of the individual inverters I1 to I8, in the coding lines L1 to L8, respectively, are connected to one input of individual ones of the #4 AND input gates (8 to 15). The outputs of the #4 AND input gates (8 to 15) are respectively connected to the ONE input of a different one of the chain of binaries BC1 to BC8. The binaries are connected in series by a direct connection from the ZERO output of each binary, except the last in the chain, to the binary count input of the next binary, the binary count input of the first binary BC1 in the chain being connected to the output of the output gate 2. A starting circuit SC is connected directly to a common bus to which the ZERO inputs of all of the binaries BC1 to BC8 are connected in parallel. The starting circuit SC is also connected through a delay generator DG1 having a delay time of 40 $\mu$s. in its operation to the second input of all of the #4 AND input gates (8 to 15) in parallel. The starting circuit SC is also connected through the 40 $\mu$s. delay generator DG1 and a second delay generator DG2 having a delay time of 150 $\mu$s. in its operation, in series to the ONE input of a second flip-flop FF2 the output of which is connected to one of the inputs of an AND gate 3. The −180° phase pulse output of the oscillator PO is connected to the other input of the AND gate 3. The output of AND gate 3 is connected to the input of a Schmitt trigger circuit ST2 the output of which is connected in parallel to the ZERO input of the flip-flop FF2 and to the ONE input of the flip-flop FF1.

The ONE outputs of all the binaries BC1 to BC8 are connected as separate inputs to the AND gate 1 the output of which is connected through Schmitt trigger circuit ST1, one input of the OR gate 5 and the output thereof to the ZERO input of the flip-flop FF1.

The 180° phase output side of the oscillator PO is connected to the input of a one-shot multivibrator OSM the output of which forms an additional input to the AND gate 1 for a purpose which will be described later.

An AND gate 6 has its several inputs connected to the output of a different one of the logical inverters I1 to I8 and its single output connected to the Schmitt type of inverter SI the output of which forms a third input to the output AND gate 2.

A Schmitt trigger ST3 is connected in the output of the AND output gate 2 before the point of connection thereto of the binary count input of the first binary BC1 in the chain of binaries and its output is connected to one input of the AND gate 7 the output of which is connected through Schmitt trigger circuit ST4 to the price accumulators including ring counters (not shown) in the accumulator line AL. A second input of the AND gate 7 is connected to the ONE output of the flip-flop FF3 the ONE input of which is connected to a SYSTEM RESET (SR) lead under control of the operator of the system, which is also connected to a second input of the OR gate 5. The ZERO input of the flip-flop FF3 is connected to a station 80 or 81 lead controlled by the operator for a purpose which will be described later. Also, the compute command or starting circuit SC is connected to a third input of the OR gate 5.

A Computation Complete lead extending to the operator of the associated circuit is connected to the ZERO output of the flip-flop FF1.

As previously mentioned, the 5 kc. pulse oscillator PO is continuously running. Therefore, the gate 2 activation input is primarily controlled by the flip-flop FF1 (ignoring the third input from the Schmitt inverter SI for the purpose of this discussion). The flip-flop FF1 is enabled upon command to start the pulse train and becomes disabled when all the digits of the binary bank assume the ONE state.

Let us consider the flip-flop FF1 enabling trigger circuitry. The triggering is derived from the delay generator DG2 the input of which is connected to the compute command (starting circuit) SC through the 150 $\mu$s. delay of that generator 2 and the 40 $\mu$s. delay or delay generator DG1. Delay generator DG2 emits a pulse 150 $\mu$s. after delay generator DG1 has fired. For counting purposes this becomes $T_0$ of FIG. 8. If this signal were used to turn on the flip-flop FF1 directly, output gate 2 would be opened in a random time relationship to the asynchronous 5 kc. oscillator PO. There could be no guarantee that the first oscillator pulse out of gate 2 would not be so small a fraction of the normal 100 $\mu$s. pulse width that the following price accumulator counters would not be stepped. (The intervening Schmitt trigger circuit ST3 does not significantly alter the pulse width presented by the output of gate 2 and is used merely to provide a power source to the accumulators in the accumulator line AL.) The binaries, however, requiring a much shorter duration impulse to be activated, would act upon this first oscillator pulse. Therefore, the accumulator count would be one digit less than the binary count. In order that a full width may be presented by the first pulse, additional circuitry was included to enable gate 2 in advance of the first pulse from oscillator PO. This function was provided by flip-flop FF2, AND gate 3 and Schmitt trigger ST2 and is accomplished in the following manner.

The −180° phase pulse output of the oscillator PO is used as one input of the two-input AND gate 3. Although the flip-flop FF2 is enabled at a random time by delay generator DG2, the gate 3 will not be opened until the arrival of the −180° signal pulse at the other input thereof. At that time, the Schmitt trigger ST2 is energized from the output of gate 3, emitting a triggering pulse to the ONE input of flip-flop FF1 which in turn enables one of the gate 2 inputs. The output of gate 2 is later enabled by the subsequent arrival of the 0° phase oscillator pulse at the second input of the gate 2. Therefore, the gate is always conditioned in advance of the 0° phase pulse and a full 100 μs. output pulse width is ensured. The flip-flop FF2 is turned off by the application of a pulse to its 0° input by the Schmitt trigger ST2 upon the occurrence of the −180° phase. No race problem is encountered by the Schmitt trigger ST2 turning off the flip-flop FF2 which feeds the Schmitt trigger ST2 input as a 2 microsecond delay is inherent in the Schmitt action, a sufficient time to properly trigger both FF1 and FF2.

The multiple input AND gate 1 is conditioned to trigger the flip-flop FF1 to inhibit gate 2 when all the binaries BC1 and BC8 count out to ONES, the triggering power being provided through the D.C. restorer Schmitt trigger ST1 and OR gate 5. Other flip-flop FF1 inhibiting or resetting signals may be presented through the other two inputs of OR gate 5. These additional inputs of OR gate 5 are provided to set flip-flop FF1 to its inhibiting condition when the circuit is first turned on, or before a computation is to take place. When the flip-flop FF1 is inhibited at the end of the counting cycle, a computation complete output impulse is derived from its ZERO output side which may be used to initiate a countdown step in the counter apparatus of the associated circuits.

The final enabling input to gate 1 is provided from the 180° phase of the oscillator PO through the one-shot multivibrator OSM. The duration of the one-shot output pulse is approximately 10 μs. keyed from the oscillator PO every 200 μs. The function of the one-shot multivibrator OSM is to serve as a buffer to reduce loading of the oscillator PO. The 180° signal is always present at the gate 1 input. The purpose of this signal is to insure that the closing of gate 1 lags (now termed +180°) 100 μs. after the final binary has counted to ONE. This insures that the flip-flop FF1 and the output gate 2 are not inhibited until the full width of the final oscillator pulse has passed to the binary counters BC1 to BC8 and the ring counters in line AL permitting them to be properly stepped.

The presence of this constant 180° oscillator signal on gate 1 can create considerable noise in the gate output while the count is proceeding in the associated binaries. If slow recovery diodes are used in this gate, half-amplitude spikes of up to one μs. duration will be generated. A voltage level sensing Schmitt trigger ST1 is used, whose triggering level is set at greater than ½ amplitude in order to present a quite signal to the input of flip-flop FF1. As shown in FIG. 7A, a small capacitor CO has been installed in parallel with the gating resistor RO to assist in attenuating the spurious transients, and the deteriorated wave front of the gating signal thus caused is restored by the fast regenerative action of the Schmitt trigger ST1.

*Auxiliary circuits*

A Schmitt inverting trigger SI has been added to the circuit to prevent a spurious count when no information is provided in the associated source, that is, when the operator initiates a compute command or starting pulse without first entering information into the associated source of binary-coded signals. The trigger SI which energizes the third AND gate 2 input, senses the output condition of all the logic inverters I1 to I8 through AND gate 6, and emits an enable signal if any of these inverters I1 to I8 has ZERO output, that is, if a ONE signal is present on any of the coding lines L1 to L8. The output gate 2 is thus conditioned to be enabled as soon as the others of its input terminals fed from flip-flop FF1 and oscillator PO, respectively, are both ONE. In the absence of a signal on the input lines L1 to L8 (representing no information in the source of binary-coded signals), all inverters I1 to I8 are at ONE, gate 6 is enabled and the Schmitt inverter SI would therefore be inhibited, holding up output gate 2 and preventing a pulse train from issuing from the converter.

Prior to installing this protective circuit, it was found that, in the absence of an input signal on the input lines L1 to L8, a spurious burst of pulses would be generated. Upon compute command, the delay generator DG1 would enable the gates 4 (the logic inverters I1 to I8 being enabled) setting all binaries BC1 to BC8 to ONE. Delay generator DG2 would enable flip-flop FF2, the appearance of the −180° oscillator phase from oscillator PO would enable gate 3, and Schmitt trigger ST2 would thus turn on flip-flop FF1. The occurrence of the −180° phase is simultaneous with the +180° signal at gate 1, triggering the Schmitt trigger ST2. Therefore, the flip-flop FF1 receives simultaneously set and reset signals and the result is random. If flip-flop FF1 is enabled, output gate 2 is in condition to transmit the next 0° oscillator signal pulse both to the accumulator line AL and to the binary input of the first binary BC1 of the chain. This will cause the binary output of counter BC1 to inhibit AND gate 1, and a spurious train of 256 pulses will be caused to be generated before the condition is again reached where all inputs to AND gate 1 are ONE, thereby shutting down the output gate 2. A compute inhibit signal from the output of Schmitt inverter SI is also supplied to apparatus in the controlling circuit.

*Accumulator lockout*

The logic addition shown in the lower right hand corner of FIG. 6, a Schmitt trigger ST4 and AND gate 7, was added to take care of conditions such as when a price is not to be sent along to a receiving device, such as a printer, but the binary to decimal converter is allowed to perform its normal conversion function in order that a computation complete signal may be sent back to the associated operator through circuits connected to the ZERO output side of the flip-flop FF1. Also, it is used when stations referred to as station 80 or 81 transmit quantity information to the converter but no price information is to be printed by the associated printer.

Gating to the price accumulator in line AL is accomplished by the AND gate 7 disabled by a flip-flop FF3, which is set by a control switch associated with station 80 or 81. The output of AND gate 7 is shaped and restored by the associated Schmitt trigger ST4 before being applied to the price accumulators in line AL. The flip-flop FF3 is reset to its enable state at the end of the computation by the operation of a Systems Reset Switch (not shown) by the operator.

The oscillator PO as shown in FIG. 7B, which is the clock pulse generating circuit, comprises a magnetic coupled transistor oscillator which generates a well-defined square-wave that does not have the usual exponential curve found in the trailing edge of capacity-coupled multivibrators. The oscillator PO provides a square-wave output of approximately 1:1 mark/space ratio, as shown in FIG. 8. The necessity for such a square-wave may be explained as follows: Referring to the block diagram of FIG. 6, the gate 3 is controlled by the flip-flop FF2 and the −180° phase pulse output of oscillator PO. The function of the logic associated with gate 3 is to ensure that the first pulse out of output gate 2 would be of full time duration, regardless of where in the cycle the flip-flop FF1 was triggered.

If a capacity-coupled multivibrator had been used for the oscillator PO, the 0° (output) phase and the −180° phase wave shapes would be as shown in FIG. 9. The triggering of flip-flop FF2 would allow gate 3, Schmitt trigger ST2, flip-flop FF1 and thus the output gate 2 to be enabled when the next −180° phase drops to −24 volts (time A). Because the 0° phase signal rises slowly, the Schmitt trigger ST3 (which is designed to actuate at +12 volts or less) will turn ON at time A and conduct until the phase voltage rises to +12 volts, and then it will turn OFF (time B). A spurious pulse of short duration would have been transmitted. Its time (2 $\mu$s.) would usually be long enough to trigger the binary counters BC1 to BC8 but may be insufficient to actuate any ring counters (6 $\mu$s.) in the accumulator line AL. Subsequent normal oscillator pulses (beginning with the next 0° phase) would proceed to complete the binary countdown. The result would be that one less count will be registered in the price accumulators than required by the binary code. This difficulty is avoided by the square-wave oscillator PO. Its transition time is ¼ microsecond and the Schmitt circuits have a delay of one microsecond, and therefore the undesirable situation is never encountered.

A brief description of the apparatus elements in FIGS. 6 and 7A to 7B and their functions in the binary to decimal converter of the invention now follows:

The coding input lines L1, L2, L3 . . . respectively supplied with binary-coded signals representing a different digit of the number to be converted, are connected to a different logic inverter I1, I2, I3 . . . each comprising a two-stage overdriven transistor amplifier of conventional type, to provide the necessary inversion of the binary signals as discussed previously. These amplifiers provide for input levels above +12 volts (ZERO logic signal) a +2 volt output level (ONE logic signal). Input levels below +12 volts (ONE logic signal) provide a +22 volt output level (ZERO logic signal). These amplifiers were designed to present a total 15K ohm load for the worst case of 8 units in parallel. A zener diode ZD is connected between the two stages of the amplifier. The high resistance $R_E$ (5.6K) was used to give a high equivalent input impedance reflected to the base of the input transistor. The stabistor diode $D_2$ provides a reverse bias for the output transistor to improve thermal stability. The other circuit elements are conventional.

The basic regenerative circuit used throughout the converter is the saturated flip-flop in which the two transistors have their emitter electrodes connected together and to ground through a common resistor $R_3$, their collectors connected through individual resistors R to the positive terminal of the 24 volt battery, the collector of each transistor connected through an individual equal resistor $R_1$ to the base of opposite transistor, and the base of each transistor connected to ground through an individual resistor $R_2$. Around this circuit is designed the flip-flops FF1, F2 and FF3, the binaries BC1, BC2, BC3 . . . and the one-shot multivibrator (time delay) OSM. All these devices use the same output impedance, drive the same loads, and are both positive and negative triggered from similar driving circuits. Their outputs are always negative-going for a ONE signal and are positive-going for a ZERO signal. A negative trigger into the base of one of the two transistors will cause the opposite transistor to turn on. Whether the positive or negative trigger is intended for the flip-flop can be easily determined by observing the direction of the triggering diode at the base—toward the base for positive trigger, away from the base for negative trigger.

The three flip-flops FF1, FF2 and FF3, which employ commutating capacitors $C_k$ (300 mf.) shunting the resistor $R_1$, do not use positive triggering. The setting inputs of the binaries BC1, BC2, BC3 . . . do, however. Their positive trigger signals are derived from the preceding single stage transistor inverting amplifiers TA1, TA2, TA3 . . . which are required when the flip-flops of the binaries BC1 to BC8 are to be triggered from a gated signal. The gated impedance level is too high to develop adequate triggering power, therefore, such an amplifier is interposed. As common-emitter transistors invert signal levels by their nature, it is more convenient to use positive triggering in the flip-flop than to employ two-stage triggering amplifiers and to restore the signal polarity by double inversion. These conventional single-stage transistor amplifiers TA1, TA2 are seen in the circuits of FIG. 7 to be interposed between the #4 input gates 8, 9, 10 . . . and the binaries BC1, BC2, BC3 . . . The binaries BC1, BC2, BC3 trigger each other in the binary mode, from negative-going voltages only. In the binaries, the diodes DB are steering diodes. A negative-going triggering pulse cannot be applied to the base of the OFF transistor which would tend to inhibit its turning ON, because the steering diode DB connected to its base is reversed bias by $+E_p$ through the resistors R and R6. In the case of the ON transistor, R6 functions to provide a charging path for the capacitor $C_b$ of the ON transistor, $R_3$ to ground. The repetition rate of the binary is governed by this charging time-constant. Base triggering is necessary with this binary because of the relatively large triggering power required and both positive and negative triggering may be used.

The one-shot time delay multivibrator OSM has the collector of its left transistor connected through a 5600 ohm resistor $R_2$ shunted by a capacitor $C_k$ to the base of the right transistor and the collector of the right transistor connected through a capacitor C to the base of the left transistor. C is selected for timing the one-shot period. During standby, the capacitor C is charged to $E_p$ (24) volts. The application of a negative trigger at the base of TR1 forces the left transistor into cut-off; capacitor C then starts to discharge from $E_p$, through resistor $R_B$, toward an opposite $E_p$ value. When the base rises above $+E_E$, the left transistor turns ON again ending the one-shot period. The diode D, connected to the collector of the right transistor is included to prevent negative noise transients from either the supply or output line from being coupled through the timing capacitor C to the base of the left transistor thus spuriously initiating a timing interval. The diode $D_2$ prevents negative current in the base-emitter junction of the left transistor when C is driven below ground at the start of the timing interval.

The delay generators DG1 and DG2 in the circuit of FIGS. 6 and 7 are one-shot multivibrators which are triggered with negative-going signals. The 40 $\mu$s. DG1 drives a four-layer diode Shockley pulse forming circuit at the end of 40 $\mu$s. to enable the #4 AND gates 7, 8, 9 . . . The output of the pulse amplifier is normally at +24 volts and all gating resistors (5600 ohms each) are held up by the 75 ohm resistor in the anode circuit of the four-layer diode 4D. The gating voltage is then held up to $$24-\frac{(24.75)}{(8.5600)}=21.6\text{ volts}$$

The pulse waveform is shown in FIG. 10 and it occurs 40 $\mu$s. after the initiating trigger into the delay generator DG1 from the compute command (starting pulse).

The 150 $\mu$s. delay generator DG2 does not drive a four-layer diode generator. The negative-going trigger into DG2 turns off the left-hand transistor. At the end of the delay of 150 $\mu$s., this transistor returns to its ON condition. The abrupt negative step of the transistor when it turns ON is transmitted to the flip-flop FF2, causing this flip-flop to be set.

The reset of binaries BC1, BC2, BC3 . . . is accomplished by a four-layer diode pulse amplifier in the Compute Command controlling circuit, this being identical to the Shockley generator in DG1 and puts out sufficient power to set all binaries simultaneously.

The Schmitt triggers ST1 to ST4 are conventional non-inverting circuits. SI is a Schmitt circuit with an additional common-emitter output transistor. As this circuit is fed from the AND gate 6 which in turn is fed from logic inverters I1 to I8, a double logic inversion is accomplished.

The 5 kc. pulse generator PO is a transistor-saturable reactor multivibrator comprised of two transistors TR1 and TR2 having their electrodes coupled through a plurality of magnetic windings on a single tapewound 50–50 nickel-iron square loop core. The emitters of the transistors TR1 and TR2 are connected together and through the common resistor $R_3$ to the negative terminal of the 24 volt battery. The collectors of the two transistors TR1 and TR2 are connected through the series-connected windings W1 and W2, the midpoint between these windings being connected through a series resistor $R_1$ to the positive terminal of the 24 volt battery. The bases of the transistors are connected through equal resistors $R_5$ through other windings W3 and W4 on the common core to a common point which is connected by the series resistor $R_4$ to the negative terminal of the battery and through the resistor $R_2$ to the common point between the other two windings W1 and W2.

In order to start oscillations in the circuit of PO, a pre-bias current is provided by the resistors $R_2$ and $R_4$. The voltage dropping resistors $R_1$ and $R_3$ provide 11 volts across the oscillator. Diodes D1, D2 are used across the base-emitter junction of each transitor to clamp the reverse voltage across the junction to −0.7 volt when the opposite transistor is in conduction which prevents the junction voltage exceeding the five volt VBE rating of the diffused junction silicon transistors which are used for the transistors TR1 and TR2. No output winding is used, the load being coupled to points A and B. Point A is considered to be the 0° phase of the pulse output point as discussed previously. Point A is used as one input of the #2 AND gate, the second input of which is the output of the flip-flop FF1. The point B, the −180° phase, is A.C. coupled to the input of the one-shot oscillator multivibrator OSM through a capacitor (.002 mfd.), and a resistor (1000 ohms) in series, and also directly to one of the inputs of the AND gate 3.

The semi-conductor best capable of meeting all the design criteria of the binary to decimal converter is the NPN silicon diode mesa transistor which is a commercial variation of the 2N697 series. It is known variously as the Texas Instrument T1483, the Fairchild or Industro 2N197, or the National 490. The exact PNP complement is the Texas Instrument J3022 or the Fairchild 2N1991. Accordingly, this device (or its complement) is used as the active element in all the transistor type circuits within the binary to decimal converter as described.

All diodes in the converter are solid state silicon diodes and were selected because of their greater forward-to-reverse resistance ratio, low leakage, and high voltage operating capabilities. These diodes will all be of the same type and are used for gating, logic and isolation purposes. The life of these diodes will be equally as long as the transistors or four-layer diodes.

Due to large instantaneous triggering power required for the multivibrators, it was desirable to amplify after a single stage of gating. In cases where inversion was not required, this was accomplished by an emitter follower. The PNP mesa transistor 2N1991, is used for this service.

Referring to FIGS. 6, 7A and 7B, one cycle of operation will be described for the binary to decimal converter of the invention—the conversion of the binary code for the decimal number into a train of 25 pulses and the generation of the Computation Complete Signal.

*At-rest condition of the circuit*

At the completion of a prior conversion cycle, the System Reset signal occurs—resetting flip-flop FF3 to the enable (ONE) condition and through one of the OR gate 5 inputs resetting flip-flop FF1 to ZERO with the right side transistor conducting. Flip-flop FF1 normally is reset at the end of each computation cycle, and this system reset signal is only a precautionary measure in case a spurious signal had triggered FF1 into an enable state.

All binaries BC1 to BC3 are in their enable (ONE) states, having counted out to this condition in the prior computation—their right side transistors are conducting. Flip-flop FF2 is in ZERO state (left transistor conducting). Schmitt triggers ST2, ST3 and ST4 are in ZERO. Schmitt trigger ST1 is oscillating between ONE and ZERO because all eight binary inputs of gate 1 are enabled and the gate output is following the one-shot multivibrator OSM which in turn is being repetitively fired by the free-running oscillator PO. The flip-flop FF1, being already inhibited, does not further respond to the actions of Schmitt trigger ST1.

Delay generators DG1 and DG2 are quiescent, the output level of the four-layer diode pulse generator is at + supply. The output of DG2 is near ground, but this D.C. level is blocked by a capacitor from further affecting FF2.

The D.C. level on the diode coding lines L1 to L8 may either be at positive or near ground, depending upon the demands of the coded number presently impressed upon the associated matrix. The logic inverter amplifiers I1 to I8 fed from these lines will accordingly present ZERO or ONE output levels to the #4 input gates (8 to 15). Because, however, the second input of all these gates are inhibited by the delay generator DG1 output being +, their following trigger amplifiers are quiescent.

Inverter Schmitt SI output will be enabled if any matrix line has an enable level (ground).

*Compute command*

We now assume that a coded number is in the source of binary signals and the compute command (starting signal) arrives from equipment in the Front End controlled by the operator of the system. The nature of this signal is a power pulse, shown in FIG. 10.

The energy contained in this pulse is $3.6 \times 10^{-6}$ coulombs, sufficient to trigger more than ten binaries. The signal is applied through a single 0.1 mfd. condenser to all the eight binary reset inputs, in parallel. As it appears as a negative pulse to the right side transistor bases of the binaries, these transistors are turned off and the left side transistors are thereby caused to conduct, bringing their collectors about 3 volts above ground. This is the ZERO state of the binaries, left side in conduction or enabled—right side OFF or inhibited. (It is the right side transistor collectors that appear as inputs to the gate 1.)

The signal from compute command also appears as a negative-going pulse at the input of delay generator DG1 thereby turning OFF its left transistor. At the end of the timing interval of 40μs., the left transistor snaps back into conduction. This negative step is applied to the associated Shockley four-layer diode 4D in a manner to initiate conduction in the diode. The abrupt turn-on action of this diode causes a pulse to appear across the 75 ohm load resistor, whose nature is the same as in FIG. 10. This pulse is transmitted on the output line which feeds the second input of all #4 coding gates (8 to 15). It also feeds into delay generator DG2 thereby commencing the second delay period (150μs.) which at its termination initiates the next series of events.

Referring to FIG. 8, the first result of computation command is shown at the reset point of the figure—all binaries are inhibited.

*Setting of the binaries*

For the given example, the binary code of 25 is assumed to be presented to the converter input lines. The coding is

| L8 | L7 | L6 | L5 | L4 | L3 | L2 | L1 |
|---|---|---|---|---|---|---|---|
| 0 | 0 | 0 | 1 | 1 | 0 | 0 | 1 |

The logic inverter amplifiers fed from the matrix lines present the inverse of this code at their outputs:

| L8 | L7 | L6 | L5 | L4 | L3 | L2 | L1 |
|---|---|---|---|---|---|---|---|
| 1 | 1 | 1 | 0 | 0 | 1 | 1 | 1 |

Accordingly, the first inputs to the gates will be either enabled or inhibited; for example: #4 gate (8), connected to I1 (L1) will have its first input section inhibited, near positive supply; #4 gate (9), connected to I2 (L2) will have its first input section enabled, near ground level; and so on for the other gates. Of course, the outputs of these gates remain all at positive potential until the Shockley four-layer diode pulse generator SG of DG1 is triggered into conduction.

When the 40μs. delay of DG1 times out, and the negative-going output pulse appears on the second-input gating bus of the #4 gates (8 to 15), the gates whose first inputs are at ground level follow the bus pulse toward ground.

The inhibited gates drop only a few volts until they are caught at the division +24 v.–(24 v. 560 ohms)/ 10K ohm=+22.8 v. provided by the inverter amplifier I2 to I8 output load resistor and the gating resistance. All gates had previously been held to 24 v.–(24 v. 75 ohms/(10K ohms/8)=+23.3 v. by the 75 ohm anode resistor of the Shockley diode SD. This small jitter of −0.5 volt cannot affect the following trigger amplifier as they are insensitive to noise pulses of 12 volts.

The enabled #4 AND gates (8 to 15) fall to a level of +3 volts, a negative-going step of 20.3 volts. The rate of fall faithfully follows the turn-on of the four-layer diode 4D—approximately 100 nanoseconds. When the voltage step passes +12 volts going toward ground, the Zener diode ZD connected between the gate and base of the PNP transistor in the associated triggering amplifier TA1, 2, 3 . . . 8 draws current and the transistor is caused to come into conduction. Semiconductor delay mechanisms slow the transistor response time to one μs. Conduction brings the collector of this transistor into saturation, 2.5 volts less than supply. The 2.5 volts is the drop of the transistor collector-emitter and the stabistor diode DS. Prior to the conduction, the transistor collector had been resting at ground potential. Therefore, the positive-going waveform presented to the .003 mfd. output coupling capacitor CC is a full 21.5 volts with a one μs. risetime. This signal is differentiated by the condenser and applied as a positive pulse to the right side transistors of the associated binaries BC1–8. These right side transistors are thereby caused to turn on. Their collector voltage levels are brought near ground (+3 volts) and these selected binaries are, therefore, set in the ONE state. The inputs to gate 1 fed from these collectors are enabled. The inputs to this gate from all the other binaries which were not so conditioned are at positive, or inhibited.

The output of #4 AND gate (8 to 15) will remain inhibited until all of the inputs are enabled.

We now see the state of the binaries in the waveshapes of FIG. 8 at the point of time delay 1. Delay generator DG2 has just started its timing interval, allowing for transients generated by this setting action to die away. The complement of the binary code has been set into the binaries, preparatory to counting upward to 11111111.

*Opening the metering gate #2*

The Metering Gate 2 cannot be opened in a random time relationship to oscillator PO, because of the possibility of emitting a short output pulse to the accumulator bus AL. The circuits of FF2, gate 3, Schmitt ST2 are used to ensure that the gating flip-flop FF1 is not enabled during an oscillator pulse, but is conditioned in advance of the pulse.

At the end of the 150μs. delay interval of DG2, the left transistor of DG2 turns ON, emitting the negative-going step which sets FF2. The right side transistor of FF2 conducts, its collector goes to +3 volts and the first input to AND gate 3 is enabled. As soon as the next −180° phase of oscillator PO appears, the second gate 3 input, connected to the collector of the oscillator transistor, goes toward ground and the output of gate 3 is thereby enabled. Schmitt ST2 follows this voltage and emits a negative step at its output. This step is differentiated and applied as a negative pulse to the inputs of both FF2 and FF1. FF2 is caused to be inhibited by this pulse, closing gate 3 (the right-side transistor turns OFF and its collector goes positive). No further signals pass to Schmitt ST2. If delay generator DG2 had fired at any time when the −180° phase was already present at the gate 3 input, the Schmitt ST2 would also be properly driven.

FF1 is enabled by the Schmitt ST2 signal—the negative pulse is applied to the right transistor of FF1, turning it OFF and the left side ON. The input of metering gate 2 fed from this left collector is enabled. (We assume, because a binary code is on the matrix, that Schmitt inverter SI is ON, enabling its input to gate 2.) When the next 0° phase of the oscillator PO arrives (the right transistor conducts) the third input to gate 2 is enabled and the gate output level drops to +8 volts. (This voltage level is determined by the 10k. ohm input resistor $R_s$ of Schmitt ST3 and the 5.6K ohm gating resistor, [24v.−(24v. 10kΩ/15.6KΩ)]=8 volts.) As this level is below the 12 volt lower triggering level of ST3, the Schmitt output stage will turn on and remain in conduction until the gate is disabled by the disappearance of the 0° oscillator signal. The conducting interval is 100μs. (one half of a 5 kc. squarewave). The gate 2 is enabled again 100μs. later when the 0° phase reappears. Thus the Schmitt ST3 faifthfully follows the oscillator PO, emitting pulses of 20 volt amplitude, 100μs. duration with 100μs. off time (1:1 mark/space ratio), as long as all three inputs to the metering gate 2 are enabled.

The output of this Schmitt ST3 fans in two directions: to the AND gate 7 and thereby to the Schmitt ST4 and also to the binary input BC1. Gate 7 usually has its second input enabled by FF3, unless Station 81 or 80 has been operated, therefore Schmitt ST4 will follow Schmitt ST3 and provide output pulses to the accumulator bus AL.

The output of Schmitt ST3 going to the binary BC1 will provide a negative step capable of triggering BC1, the first binary of the chain. This is seen on FIG. 8 at the first negative-going step of oscillator PO after $T_o$. ($T_o$ is the firing time of the second delay generator DG2, which opens the gate 2 180° in advance of the 0° phase of the oscillator PO.)

*The binary count-down*

We have now reached the situation where the metering gate 2 is open, clock pulses are being fed into the binaries and out to the price bank accumulators in the line AL. The first pulse on the binary input line has caused binary BC1 to change its state. It originally had been at ZERO at the time $T_o$. The right side transistor collector now goes toward ground; the opposite transistor collector goes positive. This is not in the direction to trigger the cascaded binary BC2, as all binaries are caused to trigger from the negative-going action of the left side transistor of the preceding binary.

The second pulse from the metering gate 2, through Schmitt trigger ST3 again changes the state of the first binary BC2, bringing its right side transistor collector to positive and the left side collector to ground. This negative-going excursion of the left side collector is transmitted to the second binary BC2, causing it to change its state. Where its right side collector had been at ground, it is now caused to become positive, inhibiting the gate 1 input tied to this point. As the binary BC2 right side goes positive, the left side goes negative, which is transmitted to the third binary BC3 causing it to change state, its right side going positive, its left side negative. The negative-going step causes the fourth binary BC4 to change its state. The left side of this binary goes positive, so no triggering impulse is transmitted to the fifth binary at this time.

The third pulse from gate 2 causes binary BC1 to again change state. This pulse does not affect BC2, as the BC2 left side transistor collector is positive-going.

The fourth pulse again changes BC1, making the left side negative-going, which in turn causes BC2 to change, sending its left side positive. No trigger is imparted to the following binary BC3 by this polarity.

The fifth pulse changes BC1 again, but as the left side goes positive, BC2 is not affected.

The sixth pulse changes BC1, left side negative-going, which changes BC2, sending its left side negative. This in turn changes BC3, making its left side positive, which does not affect BC4.

This binary action continues in the same manner. At the ninth pulse, seen in FIG. 8, the gate 1 is being inhibited only by BC5. At the tenth pulse, BC1 to BC5 are changed simultaneously. At the beginning of the twenty-fifth pulse, the right side transistors of all the binaries are triggered to conduction, all inputs to gate 1, except from the one-shot oscillator OSM, are enabled. The output of the gate 1 must not yet be enabled (which would terminate the pulse train to the accumulator line, via Schmitt ST1, FF1, gate 2) until the full width of the pulse has passed, for danger of not maintaining the necessary time to step the accumulator.

*Closing the metering gate 2*

At the conclusion of the twenty-fifth pulse, when the 0° phase of the oscillator PO terminates (at 100$\mu$s.) and the +180° phase commences, the turn-on of the left side 180° transistor of PO imparts a negative pulse to one-shot OSM. OSM is caused to generate a 50$\mu$s. pulse, the right side of the circuit snapping into conduction at the beginning of the 50$\mu$s. period and turning off at the end. The negative-going potential of this right transistor enables the ninth and final input to gate 1. The gate output falls toward ground. As it passes the 12 volt lower triggering level of Schmitt ST1, the output stage of the Schmitt snaps into conduction. This negative step triggers FF1 into its inhibit state, the left side becoming positive, closing the metering gate 2. Simultaneously, the right side goes negative, into conduction, and this step is transmitted out to the operator as the Computation Complete signal. This signal triggers equipment in the Front End which initiates a series of events causing the generation of subsequent compute command.

With the closing of metering gate 2, Schmitt ST3 is disabled (therefore Schmitt ST4 is also disabled), and no further pulses are transmitted to the binaries BC1 to BC8 or the accumulators in the line AL.

The system is at rest between computations with the circuits in the initial state described except that a system reset signal has not appeared. This reset pulse would only have reset FF3 had it been inhibited, otherwise it has no additional effect on the state of the circuits. A new compute command (starting pulse) is awaited which would cause a second burst of decimal pulses of the same count on the same item, or a new count if a different item was in use.

Various modifications of the circuits which have been illustrated and described which are within the spirit and scope of this invention will occur to persons skilled in the art.

What is claimed is:

1. In combination with a source of binary-coded signals representing different digits of a number to be converted to decimal form, a conversion circuit comprising an output line, means for continuously generating a series of square-wave pulses of given width at a given pulse repetition rate, an output gate connecting said pulse generating means to the line, a chain of binaries connected in series by a direct connection between the ZERO output of each binary in the chain, to the binary count input of the next binary, the binary count input of the first binary in the chain being connected to the output of said output gate, a plurality of normally-disabled input gates in number equal to the number of binaries in said chain, having their inputs respectively supplied from said source with an inverted binary-coded signal presenting either a binary ZERO or a ONE representing a different digit of said number and having their outputs connected to the ONE input of a different one of said binaries, a first control means responsive to a starting pulse initiating a conversion cycle to first clear all of said binaries to the ZERO operating condition, a second control means operating with a predetermined amount of delay to enable only such of said input gates that have an inverted ONE binary-coded signal supplied to their inputs to supply those signals to the associated binaries, thereby effectively entering the complement of said number into the binaries, third control means responsive to the starting pulse with a predetermined amount of additional delay to enable said output gate and allow a train of pulses from said pulse generating means to flow to said line, and to said binary chain to be counted therein, and third gating means responsive to the count causing the outputs of all of the binaries in the chain to be set into the ONE operated condition to disable said output gate stopping the train of transmitted pulses, the number of pulses in said train passing to said line and counted by said binaries being the decimal equivalent of the binary number at the input of said circuit.

2. The combination of claim 1, in which said means for enabling said output gate includes a first flip-flop which is turned ON to open the output gate in response to the delayed starting pulse, and said pulse generating means comprises an oscillator continuously producing a square-wave output of approximately 1:1 mark/space ratio a portion of which is fed to one input of said output gate, thereby preventing said first flip-flop from causing the output gate to gate a partial pulse giving undeterminable operation by a count of one pulse.

3. The combination of claim 1, in which said output gate is a first AND gate, said pulse generating means is an oscillator continuously operating to produce alternately two square-wave pulse outputs of opposite phase, one of which is applied directly to one input of said first AND gate, and said third control means to enable the said output gate includes a first flip-flop having one of its outputs connected to one of the inputs of said first AND gate, a second flip-flop and a second AND gate having one of its inputs supplied with the ONE output of said second flip-flop in response to the supply of the starting pulse to its ONE input, a second input of said second AND gate being supplied with the opposite phase pulse output of said oscillator, means responsive to the output of said second AND gate to supply an enabling pulse to the ONE input of said first flip-flop causing the first AND gate to be enabled thereby and a disabling pulse to the ZERO output of said second flip-flop resulting in the disabling of said second AND gate.

4. The combination of claim 1, in which said output gate is a first AND gate, said pulse generating means is an oscillator continuously operating to produce alternately two square-wave pulse outputs of opposite phase one of which is supplied as ONE input to said first AND gate, said third gating means is a second AND gate having the ONE outputs of the binaries supplying separate inputs thereof, and includes a one-shot multivibrator which is energized by the other opposite phase output of said oscillator to supply an additional input to said second AND gate operating to cause its operation a predetermined interval of time after the final binary in said chain has counted to ONE.

5. The combination of claim 1, in which said output gate is a first AND gate, said pulse generating means is a multivibrator oscillator alternately producing two square-wave pulse outputs of opposite phase, and said third control means for causing said output gate to be enabled includes a first flip-flop directly controlling said first AND gate, a second flip-flop, a second AND gate having one input controlled by said second flip-flop in response to the delayed starting pulse and a second input controlled by one of the phase pulse outputs of said oscillator, and a trigger circuit controlled from the output of said second AND gate when it is operated in response to operation of its two inputs, to turn ON said first flip-flop to supply one input to said first AND gate, and to disable said second flip-flop, said oscillator alternately supplying its second phase pulse output to the second input of said first output AND gate, the simultaneous supply of pulses to both inputs of said output gate causing it to be opened in advance of the first pulse applied thereto from said oscillator so as to ensure that the first output pulse in the train passed by said output gate is of the normal pulse width.

6. The combination of claim 1, in which said output gate is a first AND gate, said pulse generating means is a multivibrator oscillator producing alternately square-wave pulse outputs of opposite phase, and the means for controlling said output gate comprises a first flip-flop which is turned ON to open said first AND gate in response to the delayed starting pulse, said third gating means responsive to the outputs of said binaries when the count causes all of them to be brought to the ONE operated condition, includes a second AND gate the output of which when it is operated causes an input to be supplied to the ZERO input of said first flip-flop to turn it to the OFF condition inhibiting said output gate, and a one-shot multivibrator which is triggered by ONE phase output of said multivibrator oscillator to supply an additional input to said second AND gate to cause its operation in a given time interval equivalent to the normal pulse width of the pulses produced by said oscillator multivibrator, after the final binary in said chain has counted to ONE, which ensures that the first flip-flop and the output AND gate are not inhibited until the full width of the final oscillator output pulse has passed to said output line, and to said binaries permitting their proper counting operation.

7. The combination of claim 1, in which said output gate is a first AND gate, said pulse generating means is a square-wave multivibrator oscillator alternately producing a pulse output having a 0° phase a —180° phase leading the 0° phase by the normal pulse width, respectively, the 0° phase output being supplied as one input to said output gate, said third means for enabling said output gate includes a first flip-flop which has one of its outputs connected to one input of said output gate, a second flip-flop having one input supplied with the delayed starting pulse, a two-input second AND gate having one input connected to the output of said second flip-flop and a second input supplied with the —180° phase pulse output of said oscillator, and a trigger circuit having its input connected to the output of said third AND gate means, the second AND gate not being enabled until the arrival of the —180° phase oscillator pulse at its second input, at which time said triggering circuit is energized from the output of said second AND gate to supply a triggering pulse to said first flip-flop which in turn enables one of the inputs of said output gate and allows the output of that gate to be later enabled by the subsequent arrival of the 0° oscillator phase pulse at another of its inputs, with the result that said output gate is conditioned to be opened in advance of the 0° phase input, and a full normal pulse width is ensured for the first pulse out of said output gate, the second flip-flop being turned OFF by said trigger circuit upon the occurrence of the —180° phase input to that flip-flop.

8. The combination of claim 1, in which said pulse generating means is a square-wave multivibrator oscillator alternately producing a pulse output having a 0° phase and a —180° phase leading the 0° phase by the normal pulse width, respectively, the 0° phase being supplied as one input to said output gate, said third gating means responsive to the outputs of said binaries when they all reach the operated ONE condition includes a first flip-flop means which is switched to the OFF condition inhibiting said output gate, a one-shot multivibrator and an AND gate having an additional input supplied with a one-shot pulse approximately 10μs. in duration by said one-shot multivibrator which is keyed to the —180° phase pulse output of said oscillator every 200μs., the function of said one-shot multivibrator being to serve as a buffer to reduce oscillator loading, the purpose of the —180° phase signal being to ensure that the closing of said output gate is approximately 100μs. after the final binary counter has counted to ONE which in turn ensures that said first flip-flop and thus said output gate are not inhibited until the full normal width of the final oscillator pulse has passed to the binary count input of the first binary in said chain permitting the binaries in the chain to be properly stepped.

9. The combination of claim 1, in which said conversion circuit includes a first flip-flop, a D.C. restorer trigger circuit and a multi-input gate OR gate operating in response to the outputs of said binary counters when they all reach the ONE condition to trigger said first flip-flop to inhibit said output gate and some of the inputs of said OR gate serving as means for presenting other inhibiting or resetting signals when the circuit is first turned ON, or before a computation is to take place.

10. The combination of claim 1, in which said conversion circuit includes a logic inverter in the input of each of said input gates for inverting the applied binary-coded signal representing a different digit of said number, an AND gate having a plurality of inputs respectively connected to the output of a different inverter, and a single output, and a Schmitt type of logic inverter connected between said output of said AND gate and a third input of said output gate for sensing the output condition of all of the first logic inverters through said AND gate and emitting an enable signal if any of these inverters has ZERO output, that is, if a ONE signal is present in the inputs of any of the input gates, to condition said output gate to be enabled as soon as the other inputs thereto are both ONE, and in the absence of no binary-coded information supplied to said logic inverters, the outputs of all of said logic inverters are at ONE condition, said AND gate is enabled and the Schmitt type of logic inverter would therefore be inhibited, holding said output gate closed and preventing an output pulse train issuing therefrom.

References Cited by the Examiner

UNITED STATES PATENTS

| | | | |
|---|---|---|---|
| 2,928,600 | 3/60 | Fleming | 340—347 |
| 2,929,556 | 3/60 | Hawkins et al. | 340—347 |
| 2,945,221 | 7/60 | Hinton et al. | 340—347 |

MALCOLM A. MORRISON, *Primary Examiner.*